(12) United States Patent
Martino et al.

(10) Patent No.: US 10,375,235 B2
(45) Date of Patent: *Aug. 6, 2019

(54) DELIVERING ADDITIONAL INFORMATION TO RECEIVING PARTIES FOR TEXT MESSAGING BASED CALLER ID

(71) Applicant: I D YOU, LLC, Allen, TX (US)

(72) Inventors: Monica Rose Martino, Plano, TX (US); Kevin V. Nguyen, Allen, TX (US); M. Gregory Smith, Fairview, TX (US)

(73) Assignee: I D YOU, LLC, Allen, TX (US)

(*) Notice: Subject to any disclaimer, the term of this patent is extended or adjusted under 35 U.S.C. 154(b) by 321 days.

This patent is subject to a terminal disclaimer.

(21) Appl. No.: 15/013,217

(22) Filed: Feb. 2, 2016

(65) Prior Publication Data

US 2016/0150077 A1  May 26, 2016

Related U.S. Application Data

(63) Continuation of application No. 14/458,531, filed on Aug. 13, 2014, now Pat. No. 9,253,315, which is a continuation of application No. 12/890,864, filed on Sep. 27, 2010, now Pat. No. 8,811,575, which is a continuation-in-part of application No. 11/974,983, filed on Oct. 17, 2007, now Pat. No. 8,625,762, and a continuation-in-part of application No. 11/974,944, filed on Oct. 17, 2007, now Pat. No. 8,488,754.

(51) Int. Cl.
*H04M 1/64* (2006.01)
*H04M 3/42* (2006.01)
*H04M 1/57* (2006.01)
*H04L 29/08* (2006.01)
*H04W 4/14* (2009.01)
*H04M 1/725* (2006.01)
*H04L 29/06* (2006.01)

(52) U.S. Cl.
CPC ...... *H04M 3/42042* (2013.01); *H04L 67/306* (2013.01); *H04M 1/578* (2013.01); *H04M 3/42068* (2013.01); *H04W 4/14* (2013.01); *H04L 69/28* (2013.01); *H04M 1/72552* (2013.01); *H04M 3/42382* (2013.01); *H04M 2250/02* (2013.01)

(58) Field of Classification Search
CPC ................................. H04M 3/42042
See application file for complete search history.

(56) References Cited

U.S. PATENT DOCUMENTS 5,940,484 A * 8/1999 DeFazio ............ H04Q 3/0029
379/142.04
6,496,569 B2 * 12/2002 Pelletier ............ H04M 15/06
379/142.01

(Continued)

*Primary Examiner* — Joseph T Phan

(57) ABSTRACT

The present disclosure describes a system, method, and computer readable medium for providing information to a receiving party in a communications network. The method includes receiving a message from a sending party and performing a lookup of information relating to the sending party in a database via an Internet Protocol connection. The lookup is based on an identifier of at least one of the sending party and the receiving party. Subsequently, the information is provided to the receiving party based on the availability of the information in the database.

20 Claims, 7 Drawing Sheets

(56) References Cited

U.S. PATENT DOCUMENTS

| | | | | |
|---|---|---|---|---|
| 6,721,406 B1 * | 4/2004 | Contractor | ............ | H04M 1/575 379/142.01 |
| 8,005,195 B2 * | 8/2011 | Luneau | ................ | H04M 1/573 340/539.1 |
| 8,300,787 B2 * | 10/2012 | Frank | .................... | H04M 15/06 379/142.02 |

* cited by examiner

DELIVERING ADDITIONAL INFORMATION TO RECEIVING PARTIES FOR TEXT MESSAGING BASED CALLER ID

CROSS REFERENCE TO RELATED APPLICATIONS

This application is a continuation of U.S. application Ser. No. 14/458,531, filed Aug. 13, 2014, entitled "DELIVERING ADDITIONAL INFORMATION TO RECEIVING PARTIES FOR TEXT MESSAGING BASED CALLER ID", issued U.S. Pat. No. 9,253,315, issued Feb. 2, 2106, which is a continuation of U.S. application Ser. No. 12/890,864, filed Sep. 27, 2010, entitled "DELIVERING ADDITIONAL INFORMATION TO RECEIVING PARTIES FOR TEXT MESSAGING BASED CALLER ID", issued U.S. Pat. No. 8,811,575, issued Aug. 19, 2014, which is a continuation-in-part (CIP) of U.S. application Ser. No. 11/974,983, filed Oct. 17, 2007, entitled 'Providing Additional Information to Called Parties', issued U.S. Pat. No. 8,625,762, issued Jan. 7, 2014, which is also a CIP of U.S. application Ser. No. 11/974,944, filed Oct. 17, 2007, entitled 'IP-Enabled Information Delivery', issued U.S. Pat. No. 8,488,754, issued Jul. 16, 2013, the above applications are incorporated herein by reference.

FIELD OF THE INVENTION

The present disclosure is generally related to a communications network, and more particularly to a system, method, and computer readable medium for providing information to receiving parties in the communications network.

BACKGROUND OF THE INVENTION

Automatic Number Identification (ANI) is a system utilized by telephone companies to identify the Directory Number (DN) of a calling subscriber. ANI serves a function similar to Caller ID, but may utilize different underlying technology. It is possible that the Caller ID can be blocked by prefixing a call with *67. ANI was originally developed for telephone company billing purposes and is now offered to commercial customers who may benefit from knowing who is calling them. In addition, ANI is one of the core technologies behind the 911 emergency services.

In commercial applications, a user may have an integrated or extraneous display affixed to a telephone. Such a display presents the ANI or telephone number of the calling party. In addition, the display may present the caller's name or calling name, also known as CNAM. The calling party may call or send a message such as a Short Messaging Service (SMS) to a called party. As such, a need exists for providing the calling party information, including the calling party's name along with other information via at least a message or text based service to the called party.

SUMMARY OF THE INVENTION

The present disclosure describes a system, method, and computer readable medium for providing information to a receiving party in a communications network. The method includes receiving a message from a sending party and performing a lookup of information relating to the sending party in a database via an Internet Protocol connection. The lookup is based on an identifier of at least one of the sending party and the receiving party. Subsequently, the information is provided to the receiving party based on the availability of the information in the database.

The system for providing information to a receiving party in a communications network comprises at least one device for receiving a message from a sending party. The system further comprises at least one database for storing information associated with the sending party. The at least one device is operable to perform a lookup of information relating to the sending party in a database via an Internet Protocol connection. The lookup is based on an identifier of at least one of the sending party and the receiving party, and provides the information to the receiving party based on the availability of the information in the database.

The computer-readable medium comprising instructions executable by a device for receiving a message from a sending party and performing a lookup of information relating to the sending party in a database via an Internet Protocol connection. The lookup is based on an identifier of at least one of the sending party and the receiving party. The instructions provide the information to the receiving party based on the availability of the information in the database.

DETAILED DESCRIPTION

The present disclosure provides additional information to a sending party or receiving parties. In the context of the present disclosure, the sending party is a party initiating or sending a message and a receiving party is a party receiving the message. Such a process is initiated when the sending party contacts the receiving party, wherein the sending party and the receiving party each use at least one electronic device and the receiving party is able to receive an ANI or a Caller ID service and is able to display and/or play related information. The message comprises a text message or a multimedia message. The at least one electronic device can be a computer, a server, a wireless phone, an Internet Protocol (IP) enabled phone, a wireless IP-enabled phone, or a device that can receive and/or transmit information. The computer readable medium (or software) of the present disclosure is stored on and/or runs on at least one of the above-mentioned electronic devices.

Figure 1:
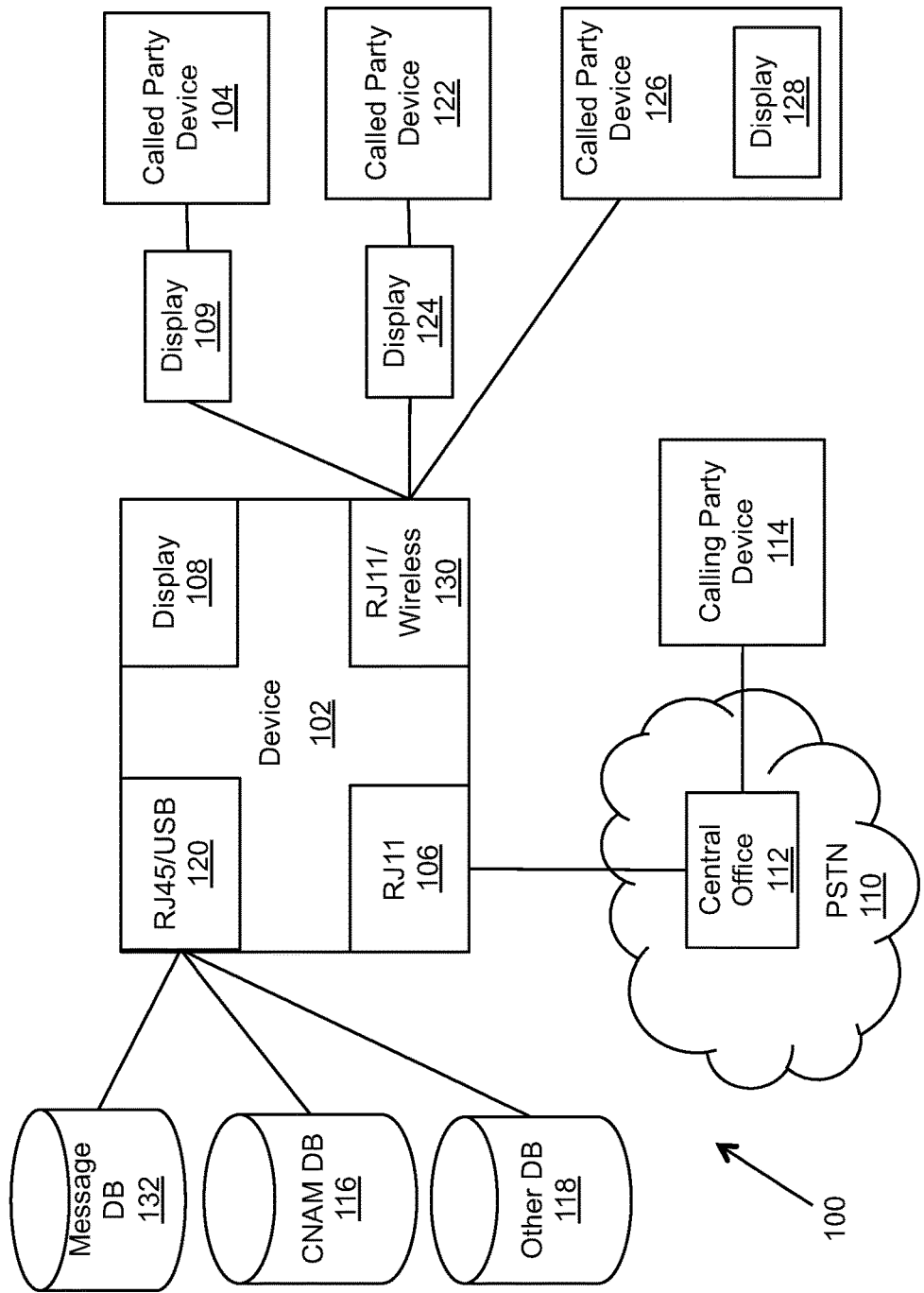
FIG. 1 depicts a system 100 for providing information to receiving parties in accordance with one embodiment of the present disclosure.

FIG. 1 depicts a system 100 for providing information to receiving parties in accordance with one embodiment of the present disclosure. The system 100 includes a device 102 that is able to send information to a called party device 104, hereafter referred to as receiving party device 104. The receiving party device 104 may be communicably coupled to the device 102 via a wired connection or a wireless connection such as a land line telephone or a wireless device including but not limited to a cellular device, a Wi-Fi connection, a PDA, a Bluetooth, etc. The device 102 may be communicably coupled but not limited to a RJ11 (telephone wire) communication address 106 and/or a RJ11/wireless communication address 130. The device 102 can specify any communication address such as 106, 120, and 130 to receive information. The device 102 includes a display 108 for displaying information. In this embodiment, the display 108 is integrated within the device 102. However, the display 108 may be implemented as a standalone device without departing from the spirit and scope of the present disclosure. Further, the device 102 may be connected to one or more displays via a wired and/or wireless connection.

In addition, the device 102 may receive information from a plurality of sources including but not limited to a communications network such as a public switched telephone network (PSTN), a code division multiple access (CDMA), a global system for mobile communication (GSM). For example, the public switched telephone network (PSTN) 110 that includes a central office 112 coupled to a calling party device 114, hereafter referred to as the sending party device 114. The information may be received via at least the RJ11 communication address 106 of the device 102. Other sources include a wireless network or data network (not shown) supporting other devices such as a computer or IP enabled phones. Generally, information received by device 102 may include telephone numbers of the sending party and the receiving party. However, various aspects of the present invention provide additional information to called parties.

Aspects of the present disclosure provide information to receiving parties, such as the receiving party device 104, by providing an ability to retrieve information of a sending party from a CNAM database 116 and/or an other database 118. The CNAM database 116 and the other database 118 comprise information relating to the sending party, for example, sending party name, telephone number, messages, location, and other information associated with the sending party. In addition, the information relating to the sending party may be a city, a state, an address, a hyperlink, a photo, a video, and any information that can be sent via an Internet Protocol (IP) connection. The device 102 communicates with the CNAM database 116 and/or the other database 118 via an IP connection.

When a sending party sends a message using the sending party device 114, the device 102 receives a caller ID, Automatic Number Identification (ANI) or other identifier from the sending party. An example of the identifier may include an IP address of the sending party device 114 or a unique identifier of the sending party that can be received and transmitted by the sending party device 114. The identifier may include information related to at least one of a sending party and a receiving party.

In response to receiving the caller ID, ANI or other identifier, the device 102 sends a query for the sending party name to the CNAM database 116 and/or the other database 118. The query may be sent via at least one communication address such as 120, 106, and 130 (the communication address may include but not limited to a wired communication and/or a wireless communication such as a cellular device, a Wi-Fi connection, a PDA, a Bluetooth connection, or the like) of the device 102 to the CNAM database 116 and/or the other database 118 via a direct connection or via a data network (not shown). Once the query is received, a lookup is performed in the CNAM database 116 and/or the other database 118 for the sending party name and other information. If the sending party name or other pertinent information is found, the CNAM database 116 and/or the other database 118 returns the sending party name and other information associated with the sending party 114 to the device 102. Thereafter, the device 102 may store the information associated with the sending party 114 in a message database. In an embodiment, the message database 132 may be implemented on the device 102. Further, the information may be stored based on configurable parameters such as, but not limited to, a number of messages, a time duration, amount of information and so forth. Moreover, the message database 132 may not include any duplicate information or records. For example, the information may be maintained for a total of 100 non-duplicate names of sending parties. In an embodiment of the invention, the device 102 may compare the information received from a new message to the information from a previous message in the database. Subsequently, the information from the previous message may be deleted if the new message is from the same sending party. Furthermore, the device 102 may maintain the information on whether the device 102 was rebooted and when. In an embodiment of the invention, the messages may be time-stamped by device 102 to keep a track of the total time since the message was received. The time-stamp information and reboot information may be stored in the message database 132.

Therefore, when a new message is received, the device 102 checks the message DB 132, for example, for the time duration between the new message and a previous message received from the sending party 114, in case the sending party information is located in the message database 132. To determine the duration, the device 102 may lookup the time-stamp of the last message received. In an embodiment, the device 102 may determine whether the message is received after a reboot from the sending party. In another embodiment, the device 102 may determine one or more of the above-specified conditions. The device 102 then determines whether the time-stamp indicates more than a predefined time duration 'N' number of hours, for example, 5 hours, have lapsed since the last communication or message exchange between the sending party 114 and the receiving party 104. As discussed above, the number N may or may not be configured as required. In case, the number of hours is more than N, then the device 102 displays the information on the display 108. Further, in case the message is received after a reboot of the device 102, then the information is displayed on the display 108. Furthermore, the device 102 may play an audio of the information if the audio announcement is enabled on the device 102. In an embodiment, the audio may include the name of the sending party 114.

In case, the information associated with the sending party 114 is not available in the message database 132, then the device 102 may send at least a query for the sending party name and/or other information related to the calling party to the CNAM database 116 and/or the other database 118. Subsequently, the message database 132 may be updated for the information. An advantage of this process is that the information associated with the sending party 114 may not be repeatedly displayed/played to the user. Moreover, this may or may not be configured based on the user's preferences.

In addition to displaying/playing the information, the device 102 may send the information to other receiving party devices, such as the calling party devices 104, 122, and 126, to be contemporaneously displayed on displays 109, 124, and 128 respectively. In this example, the displays 109, 124, and 128 are implemented as standalone devices. In other embodiments, the displays 109, 124, and 128 can be communicably coupled to the calling party devices 104, 122, and 126 or may be integrated with the calling party devices 104, 122 and 126 without departing the spirit and scope of the present disclosure. For example, the display 128 may be integrated as part of the calling party device 126 and the device 102 may send information directly to the calling party device 126 to be displayed on the display 128. The information may be sent from at least one communication address such as 106, 120, and 130 of device 102 or via the wireless connection 130. Similarly, the device 102 may send information directly to the calling party device 122 to be played as an audio.

In an embodiment, optionally, prior to performing the lookup of the sending party name, the device 102 may send a query to the CNAM database 116 or the other database 118 via an IP connection to perform a lookup of the receiving number in the database. The CNAM database 116 or the other database 118 determines if the subscriber of the receiving number is a paid/authorized subscriber. To determine whether the subscriber is the paid/authorized subscriber, the CNAM database 116 or the other database 118 may send information of the receiving number, including, the receiving party name, a credit card number, or a zipcode, to another database for verification. If the verification is acceptable, the CNAM database 116 or the other database 118 then returns the sending party name and other information associated with the sending party to the device 102.

In an embodiment of the present disclosure, the device 102 may determine if a software download is necessary on the device 102. For example, the device 102 may determine that a software download is necessary in order to obtain sending party information based on the caller ID, ANI or other identifier. The device 102 may initiate the software download either directly from a Web database or via a network, such as the Internet. Alternatively, if the software for obtaining sending party information is already stored on the device 102, no software download may be necessary.

After the software is downloaded or stored on the device 102, the device 102 recognizes the caller ID, ANI or other identifier of the sending party from the sending party device 114. The caller ID, ANI or other identifier of the sending party may comprise a 10 digit number, such as a telephone number. In response to recognizing the caller ID or other identifier of the sending party, the device 102 sends the caller ID or identifier of the sending party to the CNAM database 116 or the other database 118 to perform a lookup of the sending number.

The information received at the device 102 may include number(s) that indicates the sender's phone number, and possibly the sender's name, city, and/or state. In addition, the information includes, for example, alerts in response to an occurrence of an event, informative and promotional information from a service provider, and situational information from an emergency service provider. Furthermore, the information may include information relating to the sending party, such as an address, a hyperlink, a photo, a video, and any information that can be sent via an Internet Protocol connection.

An example of alerts in response to an occurrence of an event may involve a receiving party who has ordered a refill of prescription from a pharmacy. When the prescription is ready for pickup, the pharmacy may send a message to the device 102. The CNAM database 116 or the other database 118 may return a message to the device 102 intended for the receiving party. The message may indicate that the prescription is ready for pickup in addition to the pharmacy's name and telephone number. Also, the message may include helpful information including directions to the pharmacy, operating hours of the pharmacy, allergic reactions to the prescription, web sites for additional information about the prescription and/or the affliction the prescription is intending to solve, links to such web sites that can be accessed directly from one or more of the displays, and coupons or codes for use with the prescription and/or for other items in the pharmacy that can be used in person and/or on-line.

An example of informative and promotional information from a service provider may involve a receiving party who is subscribed to television cable service from a cable company. The cable company may send a message upon issuance of a new bill to the device 102. The CNAM database 116 or the other database 118 may return a message to the device 102 intended for the receiving party. The message may indicate that a bill is ready for review in addition to the company's name and telephone number. In addition, the message may include promotional information, such as television shows that are scheduled for the evening or movies ready for order by the receiving party.

An example of situational information from a service provider may involve a tornado that is heading towards a receiving party. The emergency service provider, such as the police or fire department, may send a message to the device 102 which may be located at the receiving party's residence. The CNAM database 116 or the other database 118 may return an emergency message to the device 102 intended for the receiving party. The message may indicate that a tornado is heading towards the residence in addition to the emergency service provider's name and telephone number. Also, the message may include the location and speed of the tornado based on the latest data and directions to nearby tornado shelters or other information related to the event.

In an embodiment of the present disclosure, if the caller ID, ANI or other identifier of the sending party matches a sending number already exists in the device 102 or in the message database 132, then the device 102 may determine that a lookup is not necessary. In this case, stored information associated with the sending number will be retrieved from the device 102 or the message database 132 and displayed to the receiving party via display 108. Alternatively, before displaying such information, the device 102 may perform the two checks, namely, the duration lapsed since last communication and whether this is the first message received from the sending party after reboot. Accordingly, if the time duration exceeds the predefined time duration, say 6, or there was a system reboot, the information is displayed/played.

In addition, if the information associated with the sending party, including sending name, is changed in the CNAM database 116 or the other database 118, the device 102 may send a query for updated information associated with the sending number to CNAM database 116 or other database 118. Continuing with the prescription example, the device 102 may recognize that a reorder of the prescription is necessary based on the information stored in the device 102. The device 102 may send a query to CNAM database 116 or the other database 118 for the updated sender's number, name, city, state, or other information such that the receiving party may use the updated information as well as the reminder in the message to reorder the prescription.

Another example of updated information associated with the sending number may involve the change of city and/or state of the sending number in the CNAM database 116 or the other database 118. The device 102 may send a query for the updated city and/or state associated with the sending number to the CNAM database 116 or the other database 118. The CNAM database 116 or the other database 118 may return the updated information associated with the sending number to the device 102.

Alternative to sending a query in response to a change of information, the device 102 may perform a periodic update of sending information from the CNAM database 116 or the other database 118. For example, the device 102 may perform an update of sending information associated with the sending number by sending a query to the database hourly, daily, weekly, bi-weekly, monthly, yearly, or after any predefined period of time.

Although the device 102 is shown separate from the receiving party device 104, a person skilled in the art will appreciate that they can be co-located. Moreover, the receiving party device 104 may include all the functionalities of the device 102, without departing from the scope of this invention.

Figure 2A:
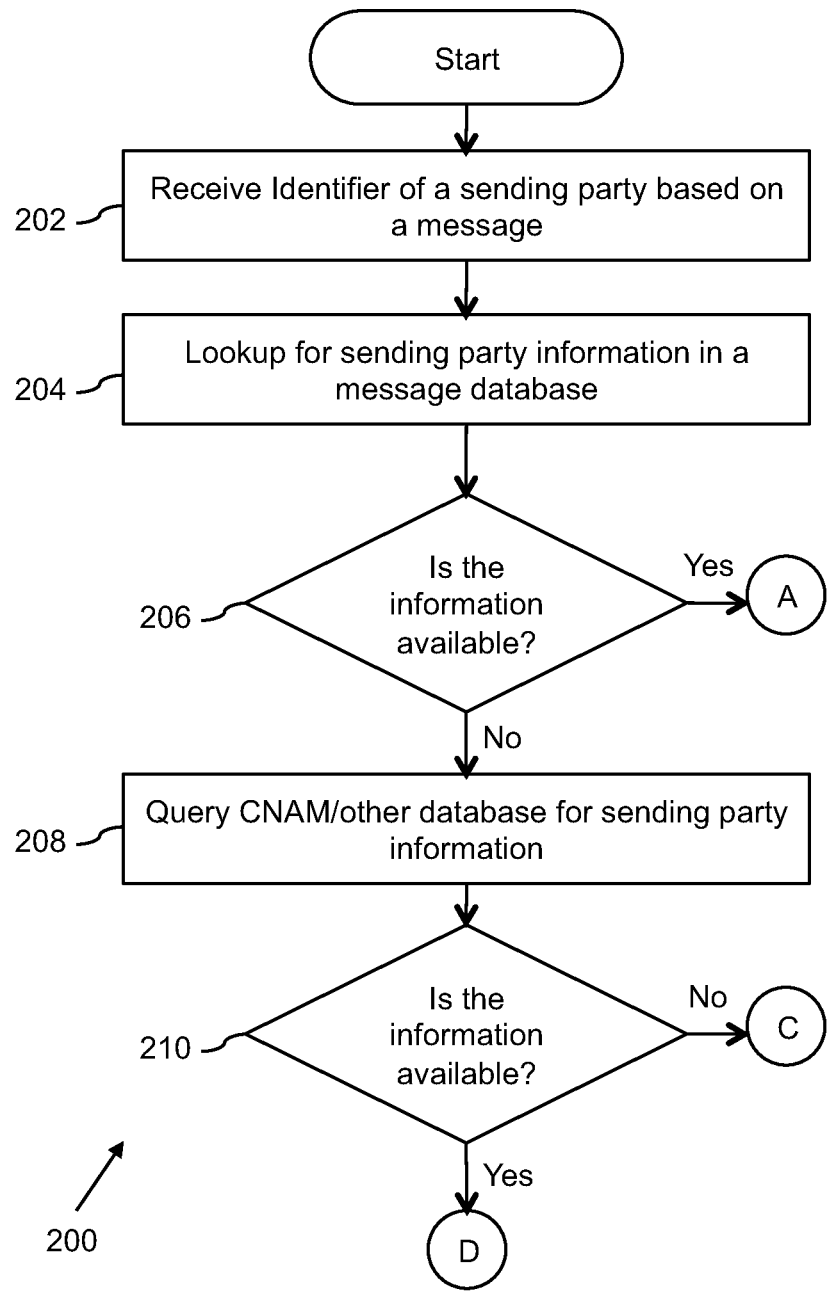
FIGS. 2A, 2B, and 2C depicts a flowchart of a method or computer readable medium comprising instructions for providing information to a receiving party in accordance with one embodiment of the present disclosure.
Figure 2B:
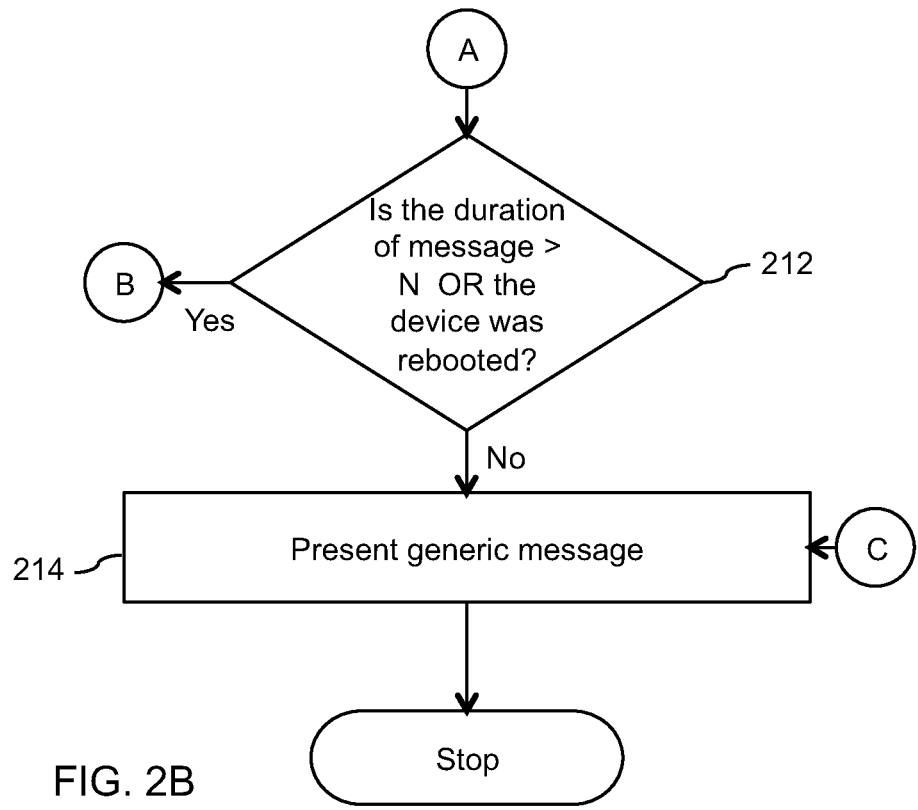
Figure 2C:
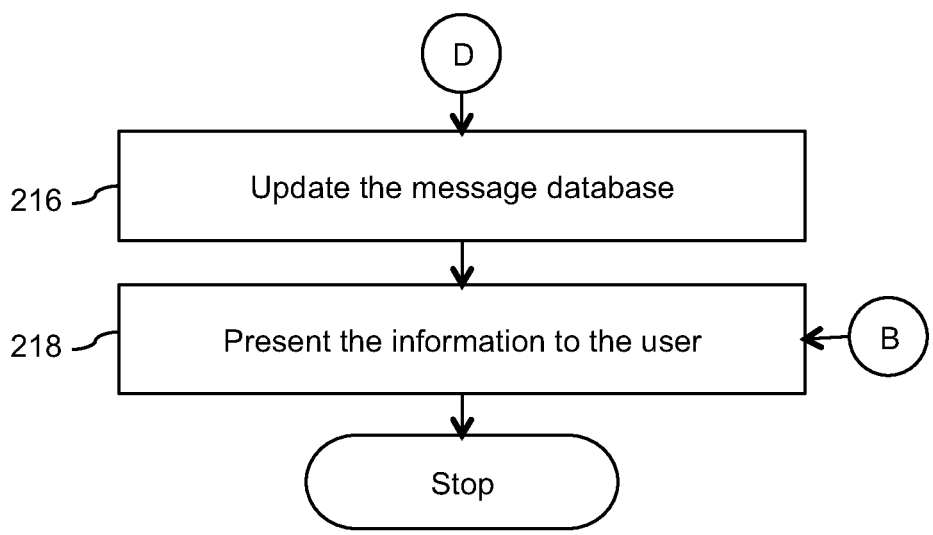

Referring to FIGS. 2A, 2B, and 2C, a flowchart of a method or computer readable medium comprising instructions for providing additional information to a receiving party is depicted in accordance with one embodiment of the present disclosure. In this example, process 200 may be implemented as instructions executing within the device 102. A sending party may send a message to the receiving party. The message may include a caller ID, ANI or other identifier of the sending party. The process 200 begins at step 202, with receiving the caller ID, ANI or identifier of the sending party. The ANI or identifier may be received at least one communication address such as 106, 120, and 130 of device 102. Thereafter, at step 204 the device 102 looks up the message database 132 for the information associated with the sending party, for example, sending party name, telephone number, messages, location, and other information associated with the sending party. The process 200 then continues to step 206 to determine if the sending party information is found in the message database 132. If the sending party information is not found in the message database 132, then the process 200 continues to step 208.

At step 208, queries the CNAM database 116 or the other database 118 for the sending party information based on the caller ID, ANI or identifier. The query may be sent via at least one communication address such as 106, 120, and 130 of the device 102. The process 200 then continues to step 210 to determine if the sending party information is found in the CNAM database 116 or the other database 118. If the sending party information is found in the CNAM database 116 or the other database 118, then the process 200 continues to step 216, where the message database 132 is updated. Thereafter, at step 218 the information is presented to the user. For example, the name of the sending party is displayed. Further, the information may be presented as audio announcement of the sender party's name. Otherwise, a default or a generic message may be presented at step 214.

At step 210, if the sending party information is found in the message database 132, then the process continues to step 212. During this step 212, it may be determined the duration since the last communication or message exchange between the sending party and the receiving party was performed. If the duration is more than a predefined time duration N, or the device 102 was rebooted before receiving this message, then the process 200 continues to step 218, where the information is presented to the user. Otherwise, the process 200 continues to step 214 where a generic or a default message or information is presented. As discussed above, the information may include the name of the sending party or the audio of the sending party's name.

In an embodiment, if the sending party number is not present in the phonebook/contact list of the receiving party device, the sending party number may be displayed against the field mobile or home on the receiving party device 102. This may help the receiving party to store/add the number to a receiving party phonebook/contact list or the like.

Figure 3:
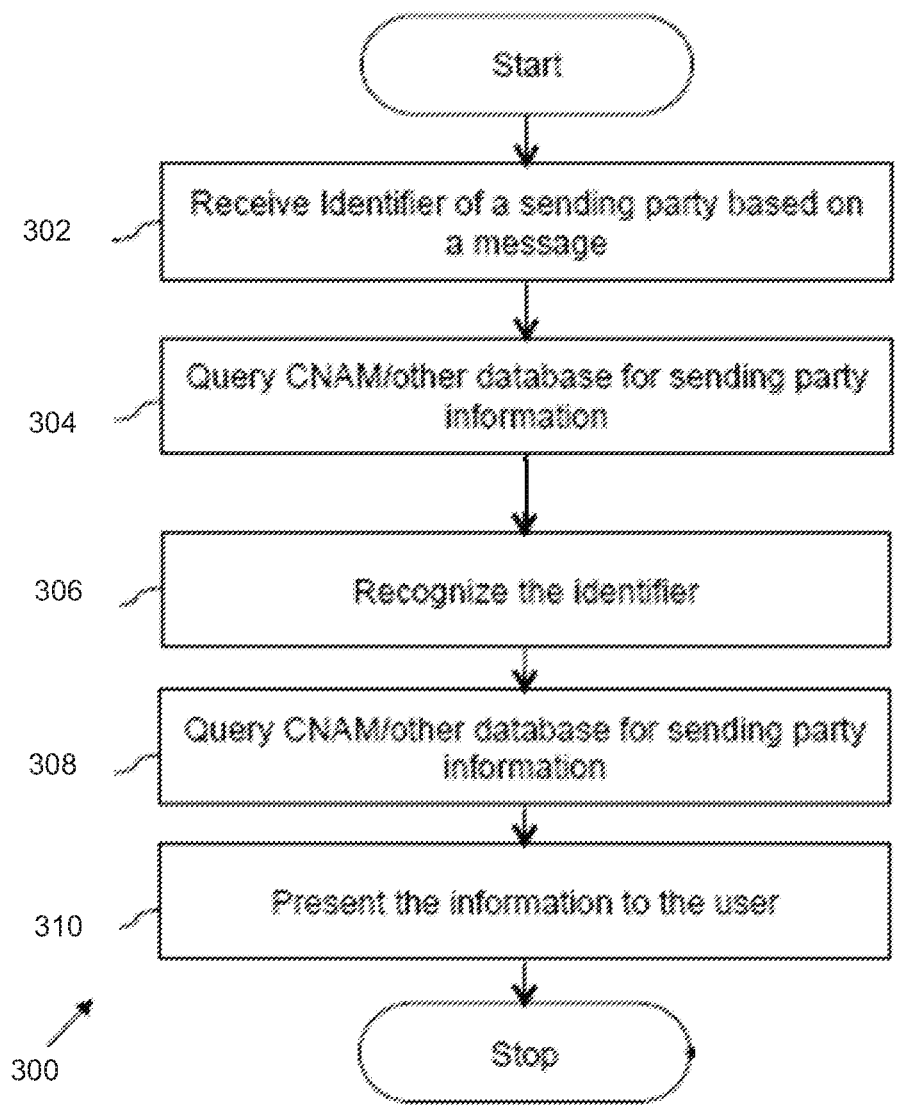
FIG. 3 depicts a flowchart of a process (which includes a method or computer readable medium comprising instructions) for checking whether the receiving party is a authorized subscriber and/or a paid subscriber of the service in accordance with an embodiment of the present disclosure.

Referring to FIG. 3, a flowchart of a process 300 (which includes a method or computer readable medium comprising instructions) for checking whether the receiving party is a paid/authorized subscriber of the service is depicted, in accordance with an embodiment of the present disclosure. The process 300 begins at step 302, with receiving the caller ID or identifier of the sending party at the device 102. The identifier includes the number of at least one of a sending party and a receiving party. Next, the process 300 continues to step 304 to query the CNAM database or the other database of the receiving number via an Internet protocol connection.

In an embodiment of the present disclosure, the device 102 may determine if a software download is necessary on the device 102. For example, the device 102 may determine that a software download is necessary in order to obtain sending party information based on the caller ID, ANI or other identifier. The device 102 may initiate the software download either directly from a Web database or via a network, such as the Internet. Alternatively, if the software for obtaining sending party information is already stored on the device 102, no software download may be necessary. For example, the process 300 then continues to determine if the subscriber of the receiving number is a paying subscriber. This step may be accomplished by sending information of the receiving number to another database or website for verification. If the subscriber is not a paying customer, the process 300 terminates (not shown).

The process 300 continues to step 306 to recognize the ANI or identifier of the sending party and delivering the ANI to the device 102. The process 300 then continues to step 308 to query the CNAM database or other database for information associated with the calling number via an Internet protocol connection. Examples of information include the caller's number, name, city, state, an address, a text, a video, a hyperlink, or any other information that may be sent via the Internet protocol connection. Subsequently, at step 212 the sending party information may be presented. At step 310 the information is presented to the user.

Figure 4:
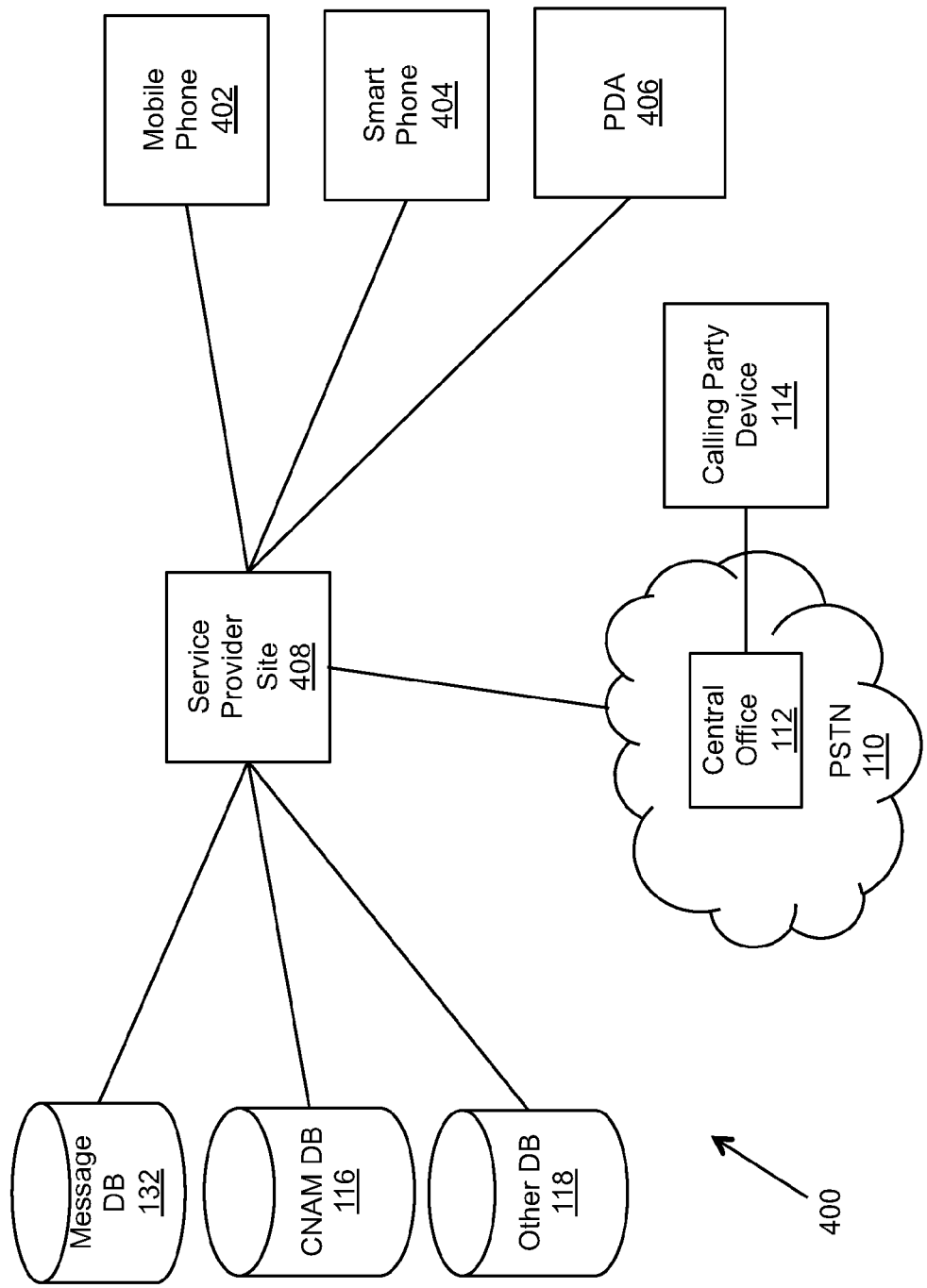
FIG. 4 depicts a system for providing information to wireless receiving parties in accordance with another embodiment of the present disclosure.

Referring to FIG. 4, a system 400 for providing additional information to called parties is depicted in accordance with an alternative embodiment of the present disclosure. System 400 is similar to system 100 in FIG. 1, except that device 102 is implemented as a wireless communication enabled device. Device 102 is being implemented as a mobile phone 402, a smart phone 404, or a Personal Digital Assistant (PDA) 406. In an embodiment of the invention, the software of device 102 is implemented on receiving party devices such as the mobile phone 402, the smart phone 404, or the PDA 406. To send and receive information to and from the CNAM database 116 or other database 118, one or more of mobile devices 402, 404, and 406 can wirelessly communicate with a service provider site 408, which is also communicably coupled to the CNAM database 116, the other databases 118, and the message DB 132 via a data network (not shown) and the calling party device(s) 114 (here after referred to as sending party device(s) 114) via the PSTN 110. The sending party device 114 can be, but not limited to, a mobile phone, a smart phone, a PDA, a landline and so forth.

In accordance with one embodiment of the present disclosure, aspects of the present disclosure are provided within the mobile devices 402, 404, and 406. Thus, when the sending party device 114 sends a message such as a text message or a multimedia message to the mobiles devices 402, 404, or 406, the service provider site 408 forwards the ANI or identifier of the calling party to devices 402, 404, or 406. The devices then send a query message (or similar message) to the message DB 132, for example, for the time duration between the new message and a previous message received from the sending party device 114, in case the sending party information is located in the message database 132. To determine the duration, the device 102 may lookup the time-stamp of the last message received. In an embodiment, the device 102 may determine whether the message is received after a reboot from the sending party.

In another embodiment of the present disclosure, a calling party device 114 connects to a receiving party device such as a mobile phone 402, a smart phone 404, or a PDA 406. At least one of the receiving party devices includes software to obtain information based on the caller ID, ANI or other identifier. The receiving party devices such as 402, 404, and 406 may receive calling party 114 phone number via a service provider 408. The receiving party device, such as the mobile phone 402, retrieves the phone number through the software and sends it to the service provider 408 through internet connectivity including but not limited to FTP, HTTP, TELNET, etc. The service provider 408 may function as a web server, listening information and requests from the software. When the service provider 408 receives a request with calling party 114 phone number, it sends the request to at least the CNAM DB 116 for name or message DB 132 for message. The information gathered from at least the 116 and 132 by the service provider 408 is sends to the receiving party device such as the mobile phone 402 (not shown).

In another embodiment, the device 102 may determine one or more of the above-specified conditions. The device 102 then determines whether the time-stamp indicates more than a predefined time duration 'N' number of hours, for example, 4 hours, have lapsed since the last communication or message exchange between the sending party 114 and the receiving party 104. As discussed above, the number N may be configured as required. In case, the number of hours is more than N, then the device 102 displays the information to the called party. Further, in case the message is received after a reboot of the device 102, then the information is displayed to the called party. Furthermore, the device 102 may play an audio of the information if the audio announcement is enabled on the device 102. In an embodiment, the audio may include the name of the sending party 114.

In case, the information associated with the sending party 114 is not available in the message database 132, then the device 102 may send a query for the sending party name to the CNAM database 116 and/or the other database 118. Subsequently, the message database 132 may be updated for the information. An advantage of this process is that the information associated with the sending party 114 may not be repeatedly displayed/played to the called party. Moreover, this could be configurable based on the called party or the user's preferences.

Figure 5A:
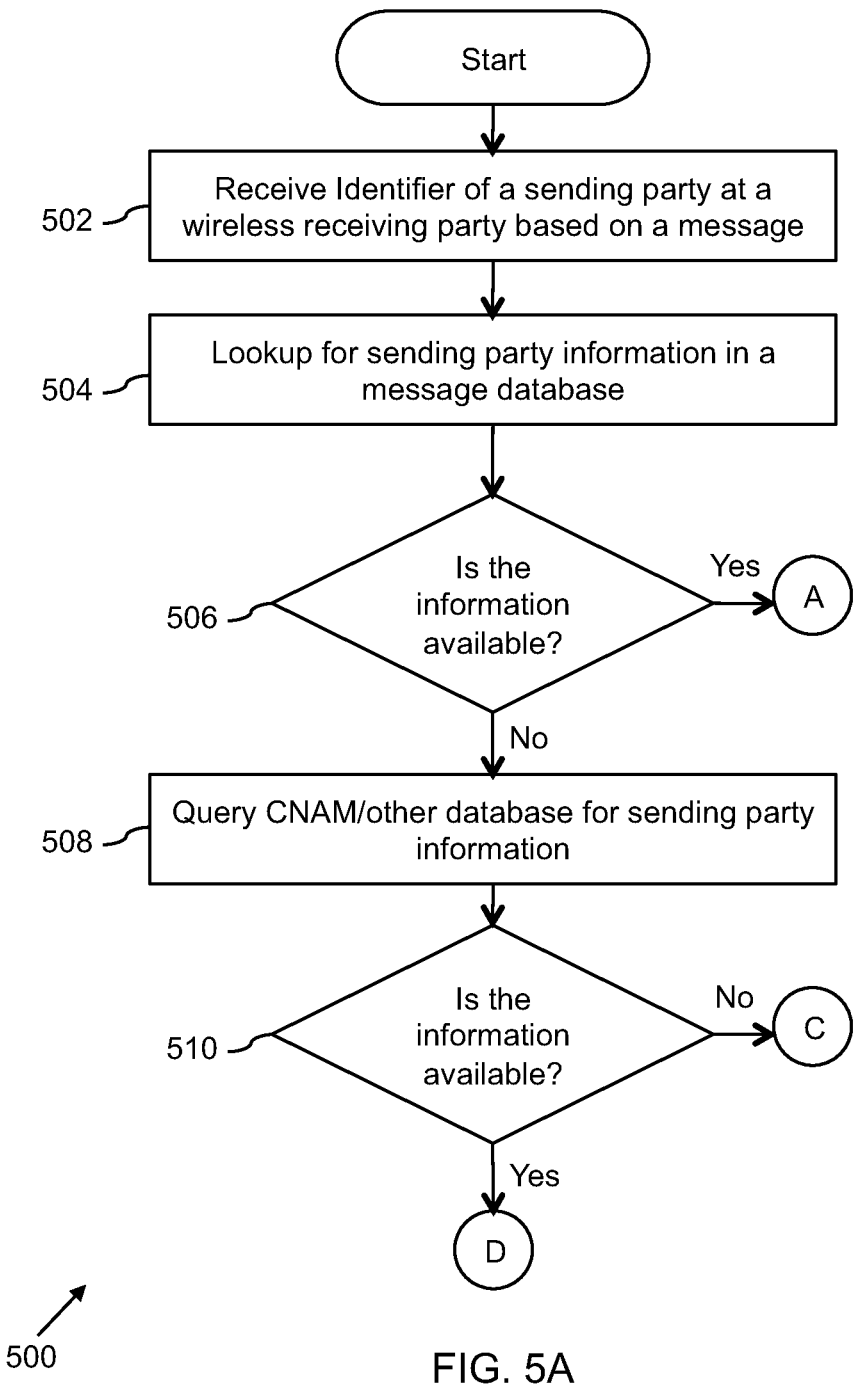
FIGS. 5A, 5B, and 5C depicts a flowchart of a method or computer readable medium comprising instructions for providing information to a wireless receiving party in accordance with one embodiment of the present disclosure.
Figure 5B:
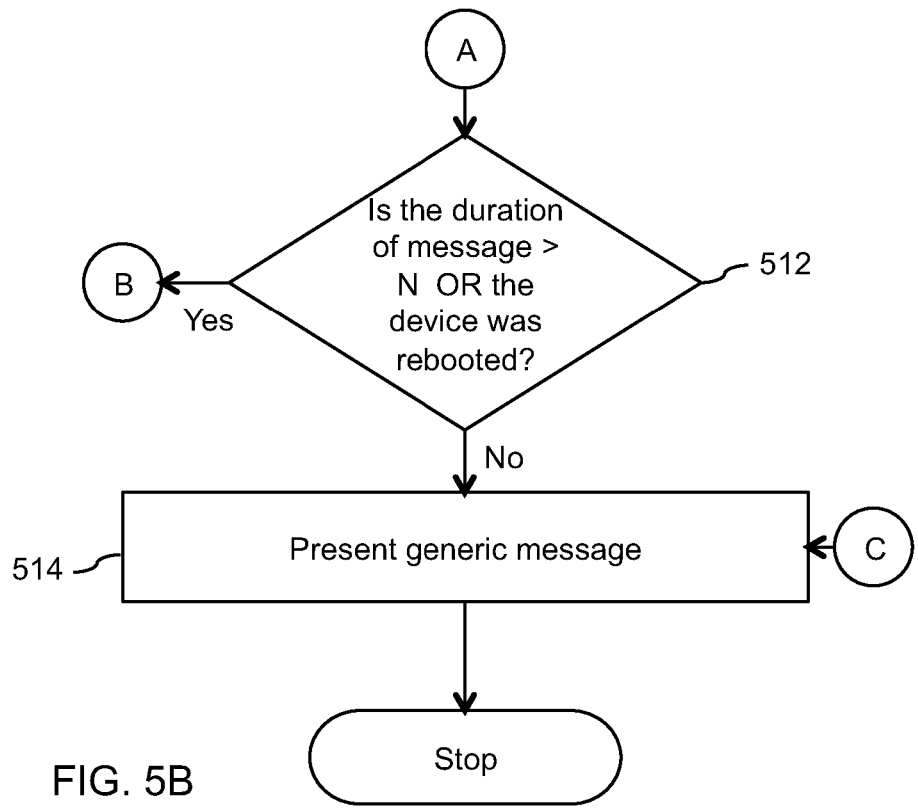
Figure 5C:
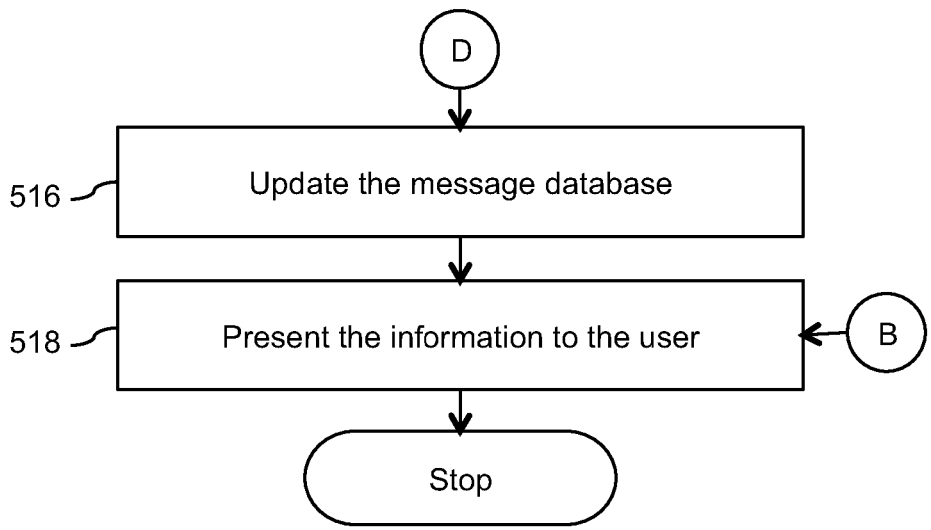

Referring to FIGS. 5A, 5B, and 5C, a flowchart of a method or computer readable medium comprising instructions for providing additional information to a wireless receiving party is depicted in accordance with one embodiment of the present disclosure. In this example, process 500 may be implemented as instructions executing within the device 402, 404 or 406. A sending party may send a message to the receiving party. The sending party may be a wireless device such as a mobile phone, a smart phone, a Personal Desktop Assistant (PDA). The message may include a caller ID, ANI or other identifier of the sending party. The process 500 begins at step 502, with wireless receiving party receiving the caller ID, ANI or identifier of the sending party. The ANI or identifier may be received at least one communication address such as 106, 120, and 130 of device 402. Thereafter, at step 504 the device 402 looks up the message database 132 for the information associated with the sending party, for example, sending party name, telephone number, messages, location, and other information associated with the sending party. The process 500 then continues to step 506 to determine if the sending party information is found in the message database 132. If the sending party information is not found in the message database 132, then the process 500 continues to step 508.

At step 508, queries the CNAM database 116 or the other database 118 for the sending party information based on the caller ID, ANI or identifier. The query may be sent via at least one communication address such as 106, 120, and 130 of the device 402. The process 500 then continues to step 510 to determine if the sending party information is found in the CNAM database 116 or the other database 118. If the sending party information is found in the CNAM database 116 or the other database 118, then the process 500 continues to step 516, where the message database 132 is updated. Thereafter, at step 518 the information is presented to the user. For example, the name of the sending party is displayed. Further, the information may be presented as audio announcement of the sender party's name. In an embodiment of the present invention a default or a generic message may be presented at step 514.

In case, at step 510, if the sending party information is found in the message database 132, then the process continues to step 512. At step 512, to determine the duration since there was last communication or message exchange between the sending party and the receiving party. If the duration is more than a predefined time duration N, or the device 402 was rebooted before receiving this message, then the process 500 continues to step 518, where the information is presented to the user. Otherwise, the process 500 continues to step 514 where a generic or a default message or information is presented. As discussed above, the information may include the name of the sending party or the audio of the sending party's name.

In an embodiment, if the sending party number is not present in the phonebook/contact list of the receiving party device, the sending party number may be displayed against the field mobile or home on the receiving party device 402. This may help the receiving party to store/add the number to the phonebook/contact list or the like.

Although an exemplary embodiment of the system, method, and computer readable medium of the present disclosure has been illustrated in the accompanied drawings and described in the foregoing detailed description, it will be understood that the invention is not limited to the embodiments disclosed, but is capable of numerous rearrangements, modifications, and substitutions without departing from the spirit and scope of the present disclosure as set forth and defined by the following claims. For example, a greater or lesser numbers of elements, modules, hardware, software, and/or firmware can be used to provide information delivery without departing from the spirit and scope of the present disclosure. Also, the device 102 may be a wireless mobile phone, a personal digital assistant, a cellular phone, an IP-enabled caller ID device, or a wired telephone that has IP communication capabilities. Further, the device 102 may include a memory (not shown) and a processor (not shown) to execute the process or the instructions. The memory may be for example, a Read Only Memory (ROM), a Random Access Memory (RAM), a disc media or any other computer readable medium comprising instruction executable by the processor.

The embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions can be loaded onto one or more general purpose computers, or other programmable data processing apparatus to produce machines, such that the instructions which execute on the computers or other programmable data processing apparatus create means for implementing the functions specified in the block or blocks. Such computer program instructions can also be stored in a computer-readable memory that can direct a computer or other programmable data processing apparatus to function in a particular manner, such that the instructions stored in the computer-readable memory produce an article of manufacture including instruction means that implement the function specified in the block or blocks.

What is claimed is:

1. A method, comprising:
performing a lookup of information relating to a sending party in a database via an Internet Protocol connection;
determining a time duration between a received message from the sending party and a previous message received from the sending party; and
providing the information to a receiving party based on the availability of the information in the database and if the time duration is more than a predefined time duration.

2. The method of claim 1, wherein the performing the lookup of the information relating to the sending party in the database is based on an identifier of at least one of the sending party and the receiving party.

3. The method of claim 2, wherein the performing the lookup of the information relating to the sending party in a database comprises:
sending a query with the identifier to the database;
determining if the identifier is located in the database; and
receiving information associated with the sending party if the identifier is located in the database.

4. The method of claim 2, further comprising receiving a message from the sending party, wherein the receiving the message further comprises receiving the identifier of at least one of the sending party and the receiving party.

5. The method of claim 1, further comprising:
determining whether the message is received after a reboot; and
providing the information to the receiving party if the message is received after the reboot.

6. The method of claim 1, wherein the providing the information comprises displaying the information on a device of the receiving party.

7. The method of claim 1, wherein the providing the information comprises playing an audio of the information on a device of the receiving party.

8. The method of claim 1, further comprising:
storing the information in a message database; and
removing duplicate information from the message database.

9. The method of claim 8 further comprising:
performing a lookup of information relating to the sending party in the message database via an Internet Protocol connection, the lookup is based on an identifier of at least one of the sending party and the receiving party; and
providing the information to the receiving party based on the availability of the information in the message database.

10. The method of claim 1, wherein the message comprises at least one of a text message and a multimedia message.

11. The method of claim 1, wherein the information relating to the sending party comprises at least one of a telephone number of the sending party, a name, a city, a state, an address, a photo, a video, a text, a hyperlink, and any other information that can be sent via the Internet protocol connection.

12. A system, comprising:
at least one device; and
at least one database that stores information associated with a sending party, wherein the at least one device is operable to perform a lookup of information relating to a sending party in the at least one database via an Internet Protocol connection, determine a time duration between the received message and a previous message received from the sending party, and provides the information to a receiving party based on the availability of the information in the at least one database and if the time duration is more than a predefined time duration.

13. The system of claim 12, wherein the lookup is based on an identifier of at least one of the sending party and the receiving party.

14. The system of claim 13, wherein the at least one device is operable to:
send a query with the identifier to the database;
determine if the identifier is located in the database; and
receive information associated with the sending party if the identifier is located in the database.

15. The system of claim 12, wherein the at least one device is operable to:
determine whether the message is received after a reboot; and
provide the information to the receiving party if the message is received after the reboot.

16. The system of claim 12, wherein the at least one device is operable to:
store the information in a message database; and
remove duplicate information from the message database.

17. The system of claim 16, wherein the at least one device is operable to:
perform a lookup of information relating to the sending party in the message database via an Internet Protocol connection, the lookup is based on an identifier of at least one of the sending party and the receiving party; and
provide the information to the receiving party based on the availability of the information in the message database.

18. A tangible non-transitory computer-readable medium comprising instructions executable by a device, the instructions comprising:

performing a lookup of information relating to a sending party in a database via an Internet Protocol connection;

determining a time duration between a received message from the sending party and a previous message received from the sending party; and providing the information to a receiving party based on the availability of the information in the database and if the time duration is more than a predefined time duration.

19. The tangible non-transitory computer-readable medium of claim 18, further comprising instructions for:

storing the information in a message database; and removing duplicate information from the message database.

20. The tangible non-transitory computer-readable medium of claim 19, further comprising instructions for:

performing a lookup of information relating to the sending party in the message database via an Internet Protocol connection, the lookup is based on an identifier of at least one of the sending party and the receiving party; and providing the information to the receiving party based on the availability of the information in the message database.

* * * * *